UNITED STATES PATENT OFFICE.

ZABDIEL A. WILLARD, OF BOSTON, MASSACHUSETTS.

IMPROVEMENT IN PROCESSES OF PREPARING TELLURIDE ORES FOR ROASTING.

Specification forming part of Letters Patent No. 186,655, dated January 23, 1877; application filed July 27, 1876.

*To all whom it may concern:*

Be it known that I, ZABDIEL A. WILLARD, of Boston, in the county of Suffolk and State of Massachusetts, have invented a new method of preparing ores of telluride of gold and silver for roasting, for the purpose of extracting these metals therefrom, of which the following is a specification:

The ores to which this method or process is more especially applicable are found in Boulder county, in the State of Colorado, which are the only ores that I have used. These ores are usually found in veins of quartzose matter of considerable width or thickness, through which the telluride is scattered irregularly in narrow streaks, varying, say, from a mere line to several inches in thickness, traversing the vein-matter.

The telluride ore by itself is often very rich in gold, assaying several thousand dollars per ton, but the average of the vein-matter will not assay more than from ten dollars to fifty dollars per ton; and it is proposed by the method or process of treatment to be described to treat profitably the poorest ores above mentioned.

The treatment of such ore is commenced by calcining it at a red heat for, say, an hour, in any convenient way—as, for instance, in a furnace similar to a continuous limekiln—which renders the ore friable and more easily broken up than in its natural condition, and it also appears to change the chemical condition of the ore in relation to the separation of the metals from each other, and from the other minerals with which it is associated, which I am not able to explain, but which I have found to be beneficial. The ore is then pulverized—by a ball-pulverizer by preference—to a fineness that will pass through a seive of, say, forty meshes to the inch. The ore is then concentrated in any usual way, to remove the barren vein-matter and avoid the expense of its subsequent treatment. But this concentration of the ore should not be carried beyond leaving, say, twenty per cent. of the neutral vein-matter to asssist the subsequent treatment. But if the telluride ore is rich in telluride, the calcination and concentration of the ore should be omitted, as the cost and the waste of the precious metal would more than counterbalance the advantages of such operations.

This telluride ore is then to be mixed with a portion of ore containing sulphuret of iron, also pulverized to the same fineness. This proportion may be determined with sufficient precision in the following manner: Estimate the percentage of clear telluride of gold in the telluride ore, and the percentage of clear sulphuret of iron in the sulphuret ore, and make the proportions about as one of sulphuret to six of telluride. The exact proportion is not material, and I am not able to say what the limits of proportion are; but that which I have above given I have ascertained, by experiment, to be efficient.

In the practical working of this process, I propose to use, to mix with the telluride ore, a gold-bearing sulphuret ore, such as is found in Colorado, in such proportion as will furnish the requisite amount of sulphuret of iron to treat the telluride of gold, so that free gold will be produced from both ores by the same treatment. The ores are then intimately mixed, and the whole mixed with about its bulk of pitch-pine sawdust or other similar carbonaceous matter, and wet with salt-water (sea-water preferred) and treated in the apparatus, and by the treatment described in my application for a patent for desulphurizing ores, of even date with the present application, and need not be otherwise further described.

By this treatment of the two ores jointly, the precious metals are freed from both of them by the same operation, as the sulphur furnished by the decomposition of the sulphuret acts upon the telluride, and causes the metals composing it to separate and leave the gold free by itself, so that it may be separated by mechanical means, or by amalgamation along with the gold contributed by the sulphuret.

What I claim is—

The method or process of preparing telluride ores for subsequent treatment, by mixing with the same a proportion of ore containing sulphuret of iron or other sulphuret, and treating the same together, substantially as described.

Executed A. D. 1876.

Z. A. WILLARD.

Witnesses:
J. ROBBINS,
WM. C. HIBBARD.